United States Patent
Fu

(10) Patent No.: US 10,505,724 B2
(45) Date of Patent: Dec. 10, 2019

(54) AUTHENTICATION METHOD, APPARATUS AND SYSTEM USED IN QUANTUM KEY DISTRIBUTION PROCESS

(71) Applicant: Alibaba Group Holding Limited, George Town, Grand Cayman (KY)

(72) Inventor: Yingfang Fu, Beijing (CN)

(73) Assignee: ALIBABA GROUP HOLDING LIMITED, Georgetown, Grand Cayman (KY)

( * ) Notice: Subject to any disclaimer, the term of this patent is extended or adjusted under 35 U.S.C. 154(b) by 109 days.

(21) Appl. No.: 15/239,131

(22) Filed: Aug. 17, 2016

(65) Prior Publication Data

US 2017/0054556 A1 Feb. 23, 2017

(30) Foreign Application Priority Data

Aug. 18, 2015 (CN) .......................... 2015 1 0509537

(51) Int. Cl.
*H04L 9/08* (2006.01)
*H04L 29/06* (2006.01)
(Continued)

(52) U.S. Cl.
CPC .......... *H04L 9/0852* (2013.01); *H04L 9/3226* (2013.01); *H04L 63/083* (2013.01); *H04W 12/06* (2013.01)

(58) Field of Classification Search
CPC .................................................... H04L 9/0852
See application file for complete search history.

(56) References Cited

U.S. PATENT DOCUMENTS

| 5,515,438 A | 5/1996 | Bennett et al. |
| 6,678,054 B1 | 1/2004 | Dress et al. |

(Continued)

FOREIGN PATENT DOCUMENTS

| CN | 102113268 A | 6/2011 |
| CN | 102904726 A | 1/2013 |

(Continued)

OTHER PUBLICATIONS

Mendes, A. J. B., Paulicena, E.H., De Souze, W.A.R., Quantum Cryptography: A Direct Approach, Journal, 2011, pp. 39-48, vol. 8, Revista De Sistemas De Informacao Da FSMA.

(Continued)

*Primary Examiner* — Nelson S. Giddins

(57) ABSTRACT

The present application discloses an authentication method used in a QKD process, and further discloses additional authentication methods and corresponding apparatuses, as well as an authentication system. The method comprises: selecting, by a transmitter according to a basis selection rule, a basis of preparation for transmitter authentication information that is generated with a first pre-provisioned algorithm and varies dynamically, and transmitting quantum states containing key information and the transmitter authentication information; and measuring, by a receiver, quantum states of the transmitter authentication information according to the basis selection rule, and ending the QKD process if a measurement result is inconsistent with corresponding information calculated with the first pre-provisioned algorithm. By means of this technical solution, dynamic authentication of a requestor of QKD can be achieved in a QKD process, a defense can be provided against spoofing attacks, man-in-the-middle attacks and distributed denial of service (DDoS) attacks, and the security of the QKD process is (Continued)

improved; furthermore, a waste of quantum key resources can be avoided as well.

16 Claims, 12 Drawing Sheets

(51) Int. Cl.
*H04L 9/32* (2006.01)
*H04W 12/06* (2009.01)

(56) References Cited

U.S. PATENT DOCUMENTS

| | | | |
|---|---|---|---|
| 7,305,091 B1 | 12/2007 | Hirano | |
| 7,451,292 B2 | 11/2008 | Routt | |
| 7,471,793 B2 | 12/2008 | Bonfrate et al. | |
| 7,570,767 B2 | 8/2009 | Lo | |
| 7,577,257 B2 | 8/2009 | Xia et al. | |
| 7,602,919 B2 | 10/2009 | Berzanskis et al. | |
| 7,620,182 B2 | 11/2009 | Berzanskis et al. | |
| 7,653,199 B2 | 1/2010 | Renes | |
| 7,706,536 B2 | 4/2010 | Dinu et al. | |
| 7,831,049 B1 | 11/2010 | Kanter | |
| 7,864,958 B2 | 1/2011 | Harrison et al. | |
| 7,889,868 B2 | 2/2011 | Wellbrock et al. | |
| 8,082,443 B2 | 12/2011 | Troxel et al. | |
| 8,180,056 B2 | 5/2012 | Kuang | |
| 8,189,785 B2 | 5/2012 | Donnangelo et al. | |
| 8,205,134 B2 | 6/2012 | Harrison et al. | |
| 8,311,224 B2 | 11/2012 | Chen et al. | |
| 8,332,730 B2 | 12/2012 | Harrison et al. | |
| 8,483,394 B2 | 7/2013 | Nordholt et al. | |
| 8,488,790 B2 | 7/2013 | Wellbrock et al. | |
| 8,559,640 B2 | 10/2013 | Mohd et al. | |
| 8,582,770 B2 | 11/2013 | Tomaru | |
| 8,611,535 B2 | 12/2013 | Brodsky et al. | |
| 8,639,927 B2 | 1/2014 | Choi et al. | |
| 8,639,932 B2 | 1/2014 | Wiseman et al. | |
| 8,650,401 B2 | 2/2014 | Wiseman et al. | |
| 8,654,979 B2 | 2/2014 | Hicks | |
| 8,675,876 B2 | 3/2014 | Yamamoto et al. | |
| 8,683,192 B2 | 3/2014 | Ayling et al. | |
| 8,693,691 B2 | 4/2014 | Jacobs | |
| 8,699,876 B2 | 4/2014 | Brodsky et al. | |
| 8,755,525 B2 | 6/2014 | Wiseman | |
| 8,774,638 B2 | 7/2014 | Duligall et al. | |
| 8,781,129 B2 | 7/2014 | Bush et al. | |
| 8,842,839 B2 | 9/2014 | Harrison et al. | |
| 8,855,316 B2 | 10/2014 | Wiseman et al. | |
| 8,891,767 B2 | 11/2014 | Zubairy et al. | |
| 8,903,094 B2 | 12/2014 | Bovino | |
| 8,929,554 B2 | 1/2015 | Hughes et al. | |
| 8,964,989 B2 | 2/2015 | Grice | |
| 8,990,583 B1 | 3/2015 | McEachron | |
| 9,002,009 B2 | 4/2015 | Nordholt et al. | |
| 9,031,236 B2 | 5/2015 | Donnangelo et al. | |
| 9,077,577 B1 | 7/2015 | Ashrafi et al. | |
| 9,112,677 B2 | 8/2015 | Tanaka et al. | |
| 9,148,225 B2 | 9/2015 | Lowans et al. | |
| 9,160,529 B2 | 10/2015 | Tajima et al. | |
| 9,178,623 B2 | 11/2015 | Chen et al. | |
| 9,219,605 B2 | 12/2015 | Niskanen et al. | |
| 9,252,986 B2 | 2/2016 | Ashrafi et al. | |
| 9,258,114 B2 | 2/2016 | Jezewski et al. | |
| 9,294,280 B2 | 3/2016 | Malaney | |
| 9,306,739 B1* | 4/2016 | Troupe | H04L 9/0852 |
| 9,331,875 B2 | 5/2016 | Ashrafi et al. | |
| 9,885,828 B2 | 2/2018 | Adams et al. | |
| 2004/0064351 A1 | 4/2004 | Mikurak | |
| 2004/0107125 A1 | 6/2004 | Guheen et al. | |
| 2004/0109564 A1 | 6/2004 | Cerf et al. | |
| 2005/0015471 A1 | 1/2005 | Zhang et al. | |
| 2005/0027862 A1 | 2/2005 | Nguyen et al. | |
| 2005/0036624 A1 | 2/2005 | Kent et al. | |
| 2005/0180575 A1* | 8/2005 | Maeda | H04L 7/0075 380/278 |
| 2006/0059253 A1 | 3/2006 | Goodman et al. | |
| 2006/0059343 A1 | 3/2006 | Berzanskis et al. | |
| 2006/0167784 A1 | 7/2006 | Hoffberg | |
| 2006/0178918 A1 | 8/2006 | Mikurak | |
| 2007/0036353 A1* | 2/2007 | Reznik | H04B 7/0434 380/30 |
| 2007/0087756 A1 | 4/2007 | Hoffberg | |
| 2007/0192598 A1 | 8/2007 | Troxel et al. | |
| 2007/0230688 A1 | 10/2007 | Tajima et al. | |
| 2008/0037790 A1 | 2/2008 | Berzanskis et al. | |
| 2008/0144833 A1* | 6/2008 | Matsumoto | H03M 13/1102 380/278 |
| 2008/0147820 A1 | 6/2008 | Maeda et al. | |
| 2009/0106553 A1* | 4/2009 | Wang | A63B 7/00 713/168 |
| 2009/0265541 A1 | 10/2009 | Ylitalo et al. | |
| 2009/0268901 A1 | 10/2009 | Lodewyck et al. | |
| 2010/0235285 A1 | 9/2010 | Hoffberg | |
| 2011/0004513 A1 | 1/2011 | Hoffberg | |
| 2011/0064222 A1* | 3/2011 | Wiseman | H04L 9/0827 380/255 |
| 2011/0251868 A1 | 4/2011 | Mikurak | |
| 2011/0126011 A1 | 5/2011 | Choi et al. | |
| 2011/0142242 A1* | 6/2011 | Tanaka | H04L 9/0858 380/282 |
| 2011/0170690 A1* | 7/2011 | Shpantzer | H04B 10/11 380/256 |
| 2011/0280397 A1 | 11/2011 | Patwar et al. | |
| 2011/0317420 A1 | 12/2011 | Jeon et al. | |
| 2012/0087500 A1 | 4/2012 | Ukita et al. | |
| 2012/0089410 A1 | 4/2012 | Mikurak | |
| 2012/0177201 A1* | 7/2012 | Ayling | H04B 10/70 380/278 |
| 2012/0198228 A1 | 8/2012 | Oberheide et al. | |
| 2012/0259722 A1 | 10/2012 | Mikurak | |
| 2012/0314863 A1 | 12/2012 | Troupe | |
| 2012/0328100 A1* | 12/2012 | Hirota | H04L 9/002 380/256 |
| 2013/0083926 A1* | 4/2013 | Hughes | H04L 9/0836 380/278 |
| 2013/0101121 A1* | 4/2013 | Nordholt | H04L 9/0852 380/279 |
| 2013/0208894 A1* | 8/2013 | Bovino | H04L 9/0852 380/278 |
| 2013/0251145 A1* | 9/2013 | Lowans | H04L 9/0838 380/44 |
| 2013/0315395 A1* | 11/2013 | Jacobs | H04L 9/0852 380/278 |
| 2014/0081793 A1 | 3/2014 | Hoffberg | |
| 2014/0222610 A1 | 8/2014 | Mikurak | |
| 2014/0310243 A1 | 8/2014 | Mcgee et al. | |
| 2014/0331050 A1* | 11/2014 | Armstrong | H04L 9/0855 713/171 |
| 2014/0337472 A1 | 11/2014 | Newton et al. | |
| 2014/0344391 A1 | 11/2014 | Varney et al. | |
| 2014/0344399 A1 | 11/2014 | Lipstone et al. | |
| 2014/0344400 A1 | 11/2014 | Varney et al. | |
| 2014/0344401 A1 | 11/2014 | Varney et al. | |
| 2014/0344425 A1 | 11/2014 | Varney et al. | |
| 2014/0344452 A1 | 11/2014 | Lipstone et al. | |
| 2014/0344453 A1 | 11/2014 | Varney et al. | |
| 2015/0036824 A1 | 2/2015 | Dixon et al. | |
| 2015/0215122 A1* | 7/2015 | Takahashi | H04L 9/0855 380/283 |
| 2015/0222619 A1* | 8/2015 | Hughes | H04L 63/08 713/168 |
| 2015/0236852 A1* | 8/2015 | Tanizawa | H04L 9/0858 380/278 |
| 2016/0218867 A1* | 7/2016 | Nordholt | H04L 9/0852 |
| 2016/0241396 A1* | 8/2016 | Fu | H04L 9/0858 |

(56) References Cited

U.S. PATENT DOCUMENTS

2016/0285621 A1 9/2016 Yuen
2018/0048466 A1* 2/2018 Chen .................... H04L 9/32

FOREIGN PATENT DOCUMENTS

WO 2014035696 A2 3/2014
WO 2015055257 A1 4/2015

OTHER PUBLICATIONS

Chip Elliot, et al., "Current Status of the DARPA Quantum Network (Invited Paper)" Proceedings Optical Diagnostics of Living Cells II, vol. 5815, May 25, 2005, p. 138-149.
Olli Ahonen et al., "Entanglement-Enhanced Quantum Key Distribution," Physical Review A 78, 032314, Sep. 11, 2008; 7 pages.
Guihua Zeng et al., "Quantum key distribution with authentication," arXiv:quant-ph/9812022v2 (https://arxiv.org/abs/quant-ph/9812022v2); Oct. 28, 1999; 15 pages.

* cited by examiner

| Authentication control information | Transmitter authentication information | Key control information | Key information |
|---|---|---|---|
| $\lambda_2$ | $\lambda_1$ | $\lambda_3$ | $\lambda_1$ |

FIG.3

| Authentication control information 00000 | Transmitter authentication information | Key control information 11111 | Key information |
|---|---|---|---|
| $\lambda_2$ | $\lambda_1$ | $\lambda_2$ | $\lambda_1$ |

FIG.4

AUTHENTICATION METHOD, APPARATUS AND SYSTEM USED IN QUANTUM KEY DISTRIBUTION PROCESS

CLAIM OF PRIORITY

The present application claims the benefit of Chinese Patent Application No. 201510509537.5 filed Aug. 18, 2015 to Fu, Yingfang, which is incorporated by reference and in its entirety.

TECHNICAL FIELD

The present application relates to the technical field of authentication, in particular to an authentication method for a quantum key distribution (QKD) process. The present invention further relates to an authentication system for the QKD process.

BACKGROUND

Authentication is an important part of ensuring network security; effective authentication can guarantee the authenticity of two communication parties, the integrity of a message and the reliability of a source, and can also protect information from attacks by illegal parties through such means as forgery, modification, and delay. Both private key cryptography mechanisms and public key cryptography mechanisms are commonly used in cryptography to ensure the security, integrity, and non-repudiation of identity information in communications, and to resist identity spoofing attacks. Quantum cryptography is a joint product of quantum mechanics and cryptography, and has proven to provide increased security and eavesdropper detectability. Quantum cryptography employs the fundamentals of quantum mechanics and is irrespective of the computing power and storage capacity of attackers. However, conventional QKD protocols do not provide an effective authentication mechanism, so a QKD process may still be subject to spoofing attacks, man-in-the-middle attacks or distributed denial of service (DDoS) attacks.

In view of the foregoing problems, the prior art provides the following two solutions:

i. M. Dusek et al. is one solution that is characterized by a belief that it is unnecessary to authenticate all pre-determined information in a quantum communication process. According to M. Dusek, only pre-determined information that affects the correct determination of the error rate of quantum states should be authenticated, and all other pre-determined information does not need to be authenticated. As a result, M. Dusek proposes a quantum authentication protocol in combination with a pre-determined message authentication algorithm, and the essence of the protocol is to authenticate as few pre-determined messages as possible with a pre-determined authentication algorithm.

ii. Another proposed solution combines the BB84 protocol with authentication. This protocol is different from the original BB84 protocol in that some bits in a randomly sent quantum bit string are set as specific authentication bits, the specific positions of the authentication bits are determined by an authentication key, authentication between two communication parties is achieved with measurement bases and polarization states of photons represented by bits of the authentication bits, and quantum states information of the authentication bits cannot be randomly sent and should be determined by an authentication key shared between the two parties according to a specific rule. A transmitter and a receiver set a portion of the shared quantum key acquired by each negotiation as an authentication key so as to realize the dynamic update of the authentication key.

The foregoing two solutions can improve the security of a QKD process to some extent because both adopt an authentication mechanism, however, they each have certain defects:

i. For the M. Dusek solution, the number of authentication keys pre-provisioned between two communication parties is limited, and the solution still adopts a pre-determined authentication technology without taking full advantage of quantum technology, so the solution inherits the risk of hacking and is vulnerable to spoofing attacks, man-in-the-middle attacks and DDoS attacks.

ii. For the BB84 protocol with authentication, although authentication information is sent in the form of quantum states to improve the security of key distribution, as this technical solution requires choosing a portion of the shared quantum key acquired by each negotiation as the authentication key, that portion of the shared quantum key can no longer be used for service data encryption, and quantum key resources are wasted.

SUMMARY

Embodiments of the present application provide an authentication method used in a QKD process, which not only provides a new idea for performing dynamic authentication in a QKD process, but can also effectively solve the issues of vulnerability and quantum key resource waste. The embodiments of the present application further provide another two authentication methods and corresponding apparatuses used in a QKD process, and an authentication system used in a QKD process.

The present application provides an authentication method used in a QKD process, where the method is implemented on a quantum communication transmitter device and a quantum communication receiver device participating in a QKD process. In an embodiment, the method comprises:

selecting, by the transmitter, a basis of preparation for authenticating the transmitter identity information according to a basis selection rule agreed upon with the receiver, and transmitting quantum states containing at least key information and the transmitter authentication information in a preset manner, wherein the transmitter authentication information is generated with a first pre-provisioned algorithm; and filtering (or differentiating), by the receiver, the received quantum states of various information in the preset manner, and measuring the received quantum states of the transmitter authentication information according to the basis selection rule, and, if the measurement result is consistent with the transmitter authentication information calculated following the first pre-provisioned algorithm, determining that the transmitter is authenticated; otherwise, determining that the transmitter is not authenticated and ending the QKD process; wherein the transmitter authentication information generated with the first pre-provisioned algorithm varies dynamically in different QKD processes initiated towards the receiver.

In an embodiment, the following operations are performed after determining (in the receiver) that the transmitter is authenticated:

generating, by the receiver, receiver authentication information with a second pre-provisioned algorithm, and transmitting the receiver authentication information; and calculating, in the transmitter, receiver authentication information with the second pre-provisioned algorithm, and, when the received receiver authentication information is consistent with the calculation result, determining that the receiver is authenticated; otherwise, determining that the receiver is not authenticated and ending the QKD process.

In an embodiment, the receiver further performs the following operations after determining that the transmitter is authenticated:

randomly selecting a measurement basis to measure the received quantum states of the key information, and disclosing the measurement basis through a pre-determined channel; and correspondingly, after determining that the receiver is authenticated, the transmitter performs the following operations:

determining a correct measurement basis of the quantum states of the key information, and screening an original key; and disclosing the correct measurement basis of the quantum states of the key information through the pre-determined channel; and correspondingly, after the step of disclosing, by the transmitter, the correct measurement basis of the quantum states of the key information, the following operations are performed:

screening, by the receiver, an original key; and acquiring, by the transmitter and the receiver, a final shared quantum key through bit error rate estimation, error correction and privacy amplification processes.

In an embodiment, the first pre-provisioned algorithm comprises: calculating the transmitter authentication information according to transmitter identification information and a synchronously changing parameter according to a preset policy by both the transmitter and the receiver; and wherein the transmitter identification information on the receiver side is pre-provisioned or sent to the receiver by the transmitter through a pre-determined channel.

In an embodiment, before selecting, by a transmitter, a basis of preparation for transmitter authentication information according to the basis selection rule agreed upon with a receiver, the following operation is performed:

performing, by both the transmitter and the receiver, authentication for the peer device of the other party with the synchronously changing parameter according to the preset policy during a request initiating interaction carried out through the pre-determined channel, and not initiating the QKD process if either device fails the authentication.

In an embodiment, the second pre-provisioned algorithm comprises: calculating the receiver authentication information according to receiver identification information and a variant of the synchronously changing parameter according to a preset policy by both the transmitter and the receiver; wherein the receiver identification information on the transmitter side is pre-provisioned or sent to the transmitter by the receiver through a pre-determined channel.

In an embodiment, the variant of the synchronously changing parameter according to the preset policy comprises the parameter itself, or a result obtained from processing the parameter with a preset mathematical transformation method.

In an embodiment, the synchronously changing parameter according to the preset policy of both the transmitter and the receiver comprises the number of times the transmitter and the receiver perform the QKD processes.

In an embodiment, calculating the authentication information comprises calculating the corresponding authentication information with a hash function.

In an embodiment, transmitting quantum states containing at least key information and the transmitter authentication information in a preset manner comprises transmitting quantum states of control information and data information with respectively different wavelengths in a preset information format, wherein the data information comprises the key information and the transmitter authentication information.

In an embodiment, the preset information is formatted such that the authentication information and the key information use respective control information as prefixes.

In an embodiment, a wavelength carrying quantum states of the control information used as the prefix of the authentication information is different from a wavelength carrying quantum states of the control information used as the prefix of the key information.

In an embodiment, the preset information is formatted such that the control information used as the prefix of the authentication information and the control information used as the prefix of the key information use different codes, respectively; the different codes are preset by the transmitter and the receiver or determined via negotiation through a pre-determined channel; and a basis for preparing or measuring quantum states of control information is preset by the transmitter and the receiver or determined via negotiation through the pre-determined channel.

In an embodiment, the preset information is formatted so that the authentication information and the key information use common control information as a prefix, and the length of the authentication information between the control information and the key information is preset by the transmitter and the receiver or determined via negotiation through a pre-determined channel.

In addition, the present application further provides an authentication method used in a QKD process, wherein the method is implemented on a quantum communication transmitter device participating in a QKD process, with the method comprising:

generating transmitter authentication information with a first pre-provisioned algorithm;

selecting a basis of preparation for the transmitter authentication information according to a basis selection rule agreed upon with a peer device participating in the QKD process; and transmitting quantum states containing at least key information and the transmitter authentication information to the peer device in a preset manner; wherein the transmitter authentication information generated with the first pre-provisioned algorithm varies dynamically in different QKD processes initiated towards the peer device.

In an embodiment, after transmitting quantum states containing at least key information and the transmitter authentication information to the peer device participating in the QKD process in a preset manner, the following operations are performed:

receiving information returned by the peer device, wherein the information comprises at least receiver authentication information;

calculating receiver authentication information with a second pre-provisioned algorithm; and determining whether the receiver authentication information received is consistent with the calculation result, and if so, then determining that the receiver is authenticated; otherwise, determining that the receiver is not authenticated and ending the QKD process.

In an embodiment, the information returned by the peer device not only comprises the receiver authentication information, but also comprises a measurement basis used for measuring quantum states of the key information; and correspondingly, after determining that a receiver is authenticated, the following operations are performed:

determining a correct measurement basis of the quantum states of the key information, and screening an original key;

disclosing the correct measurement basis of the quantum states of the key information through a pre-determined channel; and acquiring a final shared quantum key through bit error rate estimation, error correction and privacy amplification processes.

In an embodiment, the first pre-provisioned algorithm comprises calculating the transmitter authentication information according to identification information of a host device and a synchronously changing parameter of the peer device according to a preset policy.

In an embodiment, the second pre-provisioned algorithm comprises calculating the receiver authentication information according to identification information of the peer device and a variant of a synchronously changing parameter of the peer device according to a preset policy.

In an embodiment, synchronously changing parameter of the peer device according to the preset policy comprises the number of times the QKD process is performed with the peer device.

In an embodiment, calculating the authentication information comprises calculating the corresponding authentication information with a hash function.

In an embodiment, transmitting quantum states containing at least key information and the transmitter authentication information in a preset manner comprises transmitting quantum states of control information and data information with respectively different wavelengths in a preset information format, wherein the data information comprises the key information and the transmitter authentication information.

In an embodiment, the preset information is formatted so that the authentication information and the key information use respective control information as prefixes.

In an embodiment, the preset information is formatted so that the authentication information and the key information use common control information as a prefix, and the length of the authentication information between the control information and the key information is preset or determined via negotiation with the peer device through a pre-determined channel.

Correspondingly, the present application further provides an authentication apparatus used in a QKD process, wherein the apparatus is deployed on a quantum communication transmitter device participating in a QKD process, and the apparatus comprises:

a transmitter identity information generating unit, configured to generate transmitter authentication information with a first pre-provisioned algorithm, wherein the transmitter authentication information varies dynamically in different QKD processes initiated with a receiver;

a basis of preparation selection unit, configured to select a basis of preparation for the transmitter authentication information according to a basis selection rule agreed upon with a peer device participating in the QKD process; and a quantum states transmitting unit, configured to transmit quantum states containing at least key information and the transmitter authentication information to the peer device in a preset manner.

In an embodiment, the apparatus further comprises:

a receiver identity information receiving unit, configured to receive information returned by the peer device after the quantum states transmitting unit completes the quantum states transmitting operation, wherein the information comprises at least receiver authentication information;

a receiver identity information calculation unit, configured to calculate receiver authentication information with a second pre-provisioned algorithm; and a receiver authentication unit, configured to determine whether the receiver authentication information received is consistent with the calculation result, and if so, determine that the receiver is authenticated; otherwise, determine that the receiver is not authenticated and end the QKD process.

In an embodiment, the information received by the receiver identity information receiving unit not only comprises the receiver authentication information, but also comprises a measurement basis used by the peer device for measuring quantum states of the key information. According to these embodiments, the apparatus comprises:

an original key screening unit, configured to determine a correct measurement basis for the quantum states of the key information and to screen the original key after the receiver authentication unit determines that the receiver is authenticated;

a correct measurement basis disclosing unit, configured to disclose the correct measurement basis for the quantum states of the key information through a pre-determined channel; and a shared quantum key generating unit, configured to acquire a final shared quantum key through bit error rate estimation, error correction and privacy amplification processes.

In an embodiment, the first pre-provisioned algorithm used by the transmitter identity information generating unit comprises calculating the transmitter authentication information according to identification information of a host device and a synchronously changing parameter of the peer device according to a preset policy.

In an embodiment, the second pre-provisioned algorithm used by the receiver identity information calculation unit comprises calculating the receiver authentication information according to identification information of the peer device and a variant of a synchronously changing parameter of the peer device according to a preset policy.

In an embodiment, the synchronously changing parameter that is used by the transmitter identity information generating unit and the receiver identity information calculation unit for calculation according to the preset policy comprises the number of times the QKD process is performed with the peer device.

In an embodiment, the transmitter identity information generating unit or the receiver identity information calculation unit is specifically configured to calculate the corresponding authentication information with a hash function.

In an embodiment, the quantum states transmitting unit is specifically configured to transmit quantum states of control information and data information with respectively different wavelengths in a preset information format, and the data information comprises the key information and the transmitter authentication information.

In an embodiment, the preset information format used by the quantum states transmitting unit is such that the authentication information and the key information use respective control information as prefixes.

In an embodiment, the preset information format used by the quantum states transmitting unit is such that the authentication information and the key information use common control information as a prefix, and the length of the authentication information between the control information and the key information is preset or determined via negotiation with the peer device through a pre-determined channel.

In addition, the present application further provides an authentication method used in a QKD process, wherein the method is implemented on a quantum communication receiver device participating in a QKD process, with the method comprising:

receiving quantum states sent by a peer device participating in the QKD process, and differentiating the received quantum states of various information in the same preset manner as that of the peer device;

calculating transmitter authentication information with the same first pre-provisioned algorithm as that of the peer device;

selecting a measurement basis according to the same basis selection rule as that of the peer device, and measuring the received quantum states of transmitter authentication information; and determining whether a measurement result is consistent with the calculated transmitter authentication information, and if so, determining that a transmitter is authenticated; otherwise, determining that the transmitter is not authenticated and ending the QKD process.

In an embodiment, the following operations may be performed after determining that a transmitter is authenticated:

generating receiver authentication information with the same second pre-provisioned algorithm as that of the peer device; and transmitting the receiver authentication information to the peer device.

In an embodiment, the following operations may be performed after determining that a transmitter is authenticated:

randomly selecting a measurement basis to measure received quantum states of the key information, and disclosing the measurement basis through a pre-determined channel;

receiving a correct measurement basis of the quantum states of the key information sent by the peer device through the pre-determined channel; and screening an original key, and acquiring a final shared quantum key through bit error rate estimation, error correction and privacy amplification processes.

Correspondingly, the present application further provides an authentication apparatus used in a QKD process, wherein the apparatus is deployed on a quantum communication receiver device participating in a QKD process, with the apparatus comprising:

a quantum states receiving and differentiating unit, configured to receive quantum states sent by a peer device participating in the QKD process, and to filter or differentiate the received quantum states of various information in the same preset manner as that of the peer device;

a transmitter identity information calculation unit, configured to calculate transmitter authentication information with the same first pre-provisioned algorithm as that of the peer device;

an identity information quantum states measurement unit, configured to select a measurement basis according to the same basis selection rule as that of the peer device, and measure received quantum states of transmitter authentication information; and a transmitter authentication unit, configured to determine whether a measurement result is consistent with the calculated transmitter authentication information, and if so, determine that a transmitter is authenticated; and to determine that the transmitter is not authenticated and end the QKD process otherwise.

In an embodiment, the apparatus further comprises:

a receiver identity information generating unit, configured to generate receiver authentication information with the same second pre-provisioned algorithm as that of the peer device after the transmitter authentication unit determines that the transmitter is authenticated; and a receiver identity information transmitting unit, configured to transmit the receiver authentication information to the peer device.

In an embodiment, the apparatus further comprises:

a key information quantum states measurement basis disclosing unit, configured to randomly select a measurement basis to measure received quantum states of key information, and disclose the measurement basis through a pre-determined channel after the transmitter authentication unit determines that the transmitter is authenticated;

a correct measurement basis receiving unit, configured to receive a correct measurement basis of the quantum states of the key information sent by the peer device through the pre-determined channel; and a screening and shared quantum key generating unit, configured to screen an original key and acquire a final shared quantum key through bit error rate estimation, error correction and privacy amplification processes.

In addition, the present application further provides an authentication system used in a QKD process, which comprises the authentication apparatus being deployed on a quantum communication transmitter device according to any of the foregoing parts, and the authentication apparatus being deployed on a quantum communication receiver device according to any of the foregoing parts.

Compared with the prior art, the present application has the following advantages:

According to the authentication method used in the QKD process provided in the present application, a transmitter selects, according to a basis selection rule agreed upon with a receiver, a basis of preparation of transmitter authentication information that is generated with a first pre-provisioned algorithm, and transmits quantum states containing at least key information and the transmitter authentication information in a preset manner; the receiver differentiates (filters) the received quantum states of various information in the preset manner, and measures the received quantum states of the transmitter authentication information according to the basis selection rule, and if a measurement result is consistent with transmitter authentication information calculated with the first pre-provisioned algorithm, determines that the transmitter is authenticated; and determines that the transmitter is not authenticated and ends the QKD process otherwise. In the above technical solution, the transmitter authentication information, which is sent by the transmitter in the form of quantum states and generated with the first pre-provisioned algorithm, varies dynamically in different QKD processes initiated towards the receiver, and the receiver verifies the received authentication information with the same pre-provisioned algorithm, so that dynamic authentication of a requestor is achieved in a QKD process, an effective defense can be provided against spoofing attacks, man-in-the-middle attacks and distributed denial of service (DDoS) attacks on the receiver, and the security of the QKD process is improved; furthermore, a waste of quantum key resources can be avoided as authentication information is dynamically generated with an algorithm.

BRIEF DESCRIPTION OF THE DRAWINGS

FIG. 3 is a schematic diagram of a first information format as provided in the embodiment of the present application;

FIG. 4 is a schematic diagram of a second information format as provided in the embodiment of the present application;

DETAILED DESCRIPTION OF THE EMBODIMENTS

Many specific details are elaborated in the following description to facilitate a thorough understanding of the present application. However, the present application can be implemented in other manners different from what is described herein, and those skilled in the art can make similar extensions without deviating from the spirit of the present application. It is to be understood that the present application is not limited to the specific embodiments disclosed below.

The present application provides an authentication method, and additional two other authentication methods and corresponding apparatuses, and an authentication system used in a QKD process, which are described respectively in detail in the following embodiments.

Figure 1:
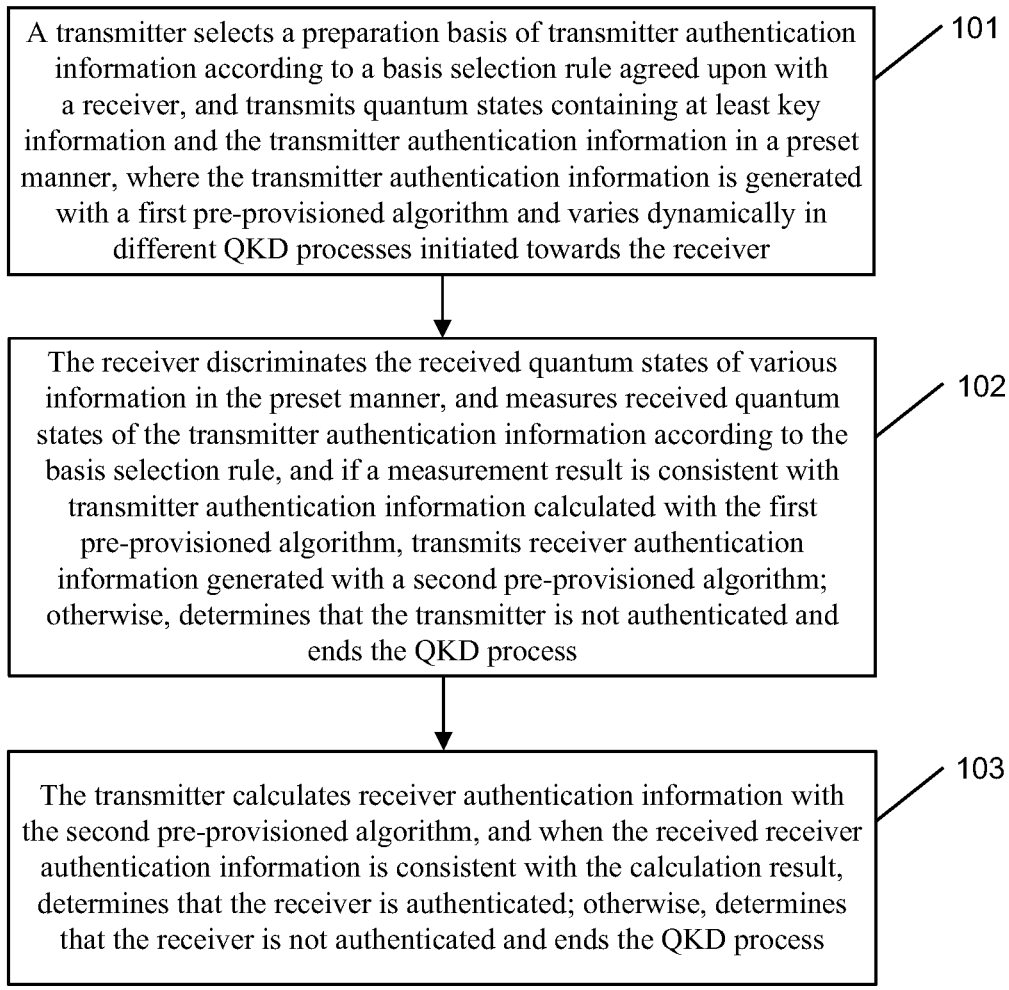
FIG. 1 is a flow diagram of an embodiment of an authentication method used in a QKD process as provided in the present application.

FIG. 1 illustrates a flow diagram of an embodiment of an authentication method used in a QKD process following the application. The method is implemented on a quantum communication transmitter device and a quantum communication receiver device participating in a QKD process. Before the specific steps of this embodiment are described in detail, the quantum communication transmitter device and the quantum communication receiver device involved in this embodiment are described briefly.

In this embodiment, identities of quantum communication devices participating in a QKD process are dynamically authenticated in the distribution process. Specifically, a first device that selects a basis of preparation and transmits quantum states to a peer device. This device (also called an initiator or a requestor of a QKD process) is defined as a quantum communication transmitter device, or a transmitter for short within this technical solution. A second device that selects a measurement basis to measure received quantum states is defined as a quantum communication receiver device, or a receiver for short within this technical solution.

According to one or more embodiments, the QKD process comprises the following stages: transmitting quantum states by a transmitter, measuring quantum states by a receiver, comparing a measurement basis by the transmitter and the receiver, screening an original key, estimating bit error rate, correcting error and amplifying privacy. Dynamic authentication is achieved in the above process according to this technical solution. In particular, after the transmitter transmits quantum states containing key information and authentication information, the receiver may verify the identity of the transmitter by measuring quantum states of the authentication information, so as to avoid spoofing attacks, man-in-the-middle attacks or DDoS attacks. In addition to the foregoing one-way authentication, the transmitter may also verify the identity of the receiver according to authentication information provided by the receiver, so as to avoid "phishing attacks," thereby achieving a more secure two-way authentication.

Following examples will focus on describing this two-way authentication. It should be noted that In one or more implementations of this technical solution, one-way authentication by the receiver on the transmitter may be performed alone, which can also achieve the beneficial effects of improving security and avoiding wasted quantum key resources.

In addition, In one or more implementations of this technical solution, the subsequent stages such as measuring quantum states of the key information and comparing the measurement basis may be proceeded after authentication is completed. The mutual authentication may also be accomplished at and interleaved with various stages. The second implementation can simplify the interaction process and improve execution efficiency. As such, the following embodiments are described using these implementations. This embodiment is described in detail below.

The authentication method used in a QKD process comprises the following steps:

Step 101: A transmitter selects a preparation basis of transmitter authentication information according to a basis selection rule agreed upon with a receiver, and transmits quantum states containing at least key information and the transmitter authentication information in a preset manner, where the transmitter authentication information is generated with a first pre-provisioned algorithm and varies dynamically in different QKD processes initiated towards the receiver.

In order to avoid initiating a QKD process between non-legitimate quantum communication devices, quantum communication devices of the transmitter and the receiver need to verify the identity of the peer device through a pre-determined channel (such as classical channel) before the transmitter initiates a QKD process. According to one or more embodiments, any subsequent QKD process can be initiated only when both devices are authenticated.

In this technical solution, the transmitter generate transmitter authentication information with a first pre-provisioned algorithm, and the transmitter authentication information varies dynamically for different QKD processes. In order to accomplish this functionality, in this embodiment, the transmitter and the receiver may each maintain a synchronously changing parameter n (relevant description can be found from relevant text in the subsequent step 101-1) according to a preset policy, and the transmitter and the receiver may use the parameter n to achieve the foregoing pre-determined channel-based authentication process.

For example, the requestor of a QKD process, i.e., the transmitter in the present application, may first transmit a quantum key negotiation request, where the request contains a hash value hash(userid_A, n) calculated based on identification information userid_A (a description of the identification information can be found from relevant text in the subsequent step 101-1) of the transmitter and the parameter n. The peer device participating in the QKD process, i.e., the receiver in the present application, then calculates a hash value of locally preset userid_A and the locally maintained parameter n after receiving the foregoing request information, and returns response information containing a hash value hash(userid_B, n) to the transmitter if the calculated value is consistent with the received value; or ends the QKD process otherwise. Similarly, the transmitter may also verify the identity of the receiver in the same way, and if the receiver is authenticated, the QKD process may be initiated; the QKD process is not initiated otherwise.

In the implementation described above, a manner for pre-provisioning both the transmitter and the receiver with identification information of the other party is adopted. In other implementations, the transmitter and the receiver is not pre-provisioned with identification information of the other party; instead, a manner of carrying identification information in the request interaction of the QKD process is adopted. For example, information sent by the transmitter comprises hash(userid_A, n) and userid_A, and information returned by the receiver comprises hash(userid_B, n) and userid_B, and the transmitter and the receiver can also acquire identification information of the other party in this manner.

Figure 2:
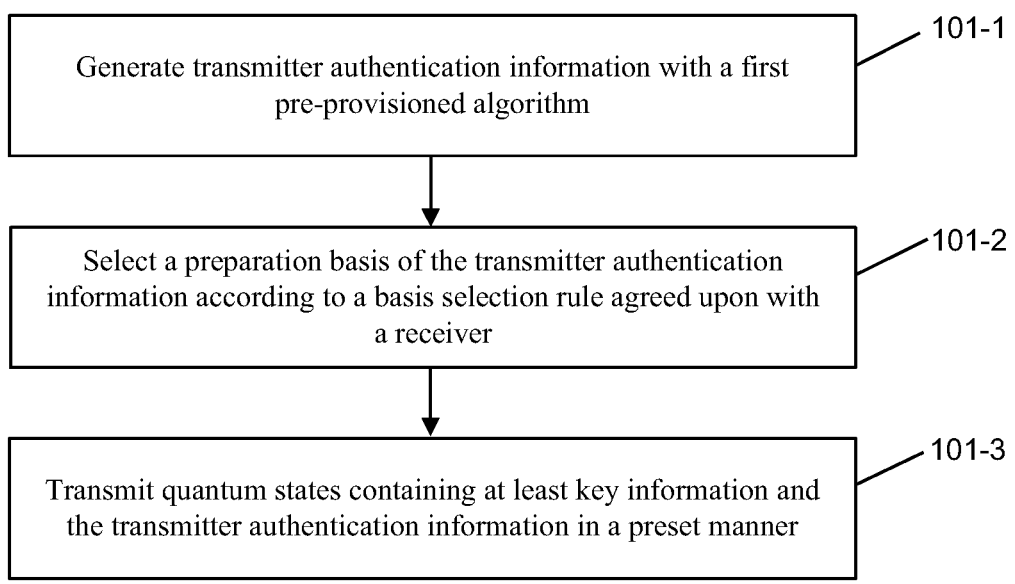
FIG. 2 is a process flow diagram depicting a transmitter transmitting quantum states containing authentication information and key information as provided in the embodiment of the present application.

If both the transmitter and the receiver are authenticated in the above process, the subsequent QKD process is initiated, and the transmitter transmits quantum states containing at least authentication information and key information to the receiver. The process comprises steps 101-1 to 101-3, and is further described below with reference to FIG. 2.

Step 101-1: Generate transmitter authentication information with a first pre-provisioned algorithm.

In this technical solution, the transmitter and the receiver are pre-provisioned with the same algorithm, i.e., the first pre-provisioned algorithm in the present application, for calculating transmitter authentication information, and the transmitter authentication information generated with the algorithm varies dynamically for different QKD processes initiated towards the receiver. In other words, authentication information of each requestor that is received by the receiver varies dynamically for the receiver, the receiver may perform authentication on the requestor according to the first pre-provisioned algorithm, and it is difficult for attackers to mimic the dynamically-varying authentication information, thus the receiver can effectively defend against spoofing attacks, man-in-the-middle attacks or DDoS attacks.

In one or more implementations, the required first pre-provisioned algorithm may be designed according to requirements as long as the dynamic-varying requirement is met. The following first pre-provisioned algorithm is used in this embodiment to calculate the transmitter authentication information according to the transmitter identification information userid_A and the synchronously changing parameter n according to a preset policy by the transmitter and receiver.

The transmitter identification information userid_A generally refers to identification information that can differentiate the transmitter from other quantum communication devices. For example, the transmitter identification information userid_A may be a device identifier as shipped from the factory or a fixed IP address of the transmitter (the same identification manner may also be adopted for receiver identification information userid_B involved in the following text).

The parameter n may be a synchronously changing numerical value according to the same preset policy by the transmitter and the receiver, i.e., a variable that can be inferred by the transmitter and the receiver. For example, the transmitter and the receiver may be pre-provisioned with the same initial numerical value and then synchronously change the respectively maintained numerical value according to a preset period, or a synchronous change may be triggered each time before a QKD process is initiated. The synchronous change may be implemented by means of a basic operation such as addition, subtraction, multiplication or division or a preset function. Because n is set locally at the transmitter and the receiver requiring no negotiation between the two parties, and n is a dynamically changing value, the probability that n is leaked or speculated is low, thereby ensuring security of authentication information.

In this embodiment, the transmitter authentication information Y may be calculated according to the following first pre-provisioned algorithm: Y=f(userid_A, n), where the transmitter and the receiver use the same function f, for example, a hash function. The transmitter may acquire its identification information userid_A by calling a local function interface, while information of userid_A on the receiver side may be pre-provisioned or sent to the receiver by the transmitter through a pre-determined channel. For example, the information is sent at the negotiation request stage before the QKD process is initiated (information of userid_B on the transmitter side may also be acquired in the same manner).

It can be seen that userid_A is known by the transmitter and the receiver, and the parameter n of the transmitter and the receiver is also inferable in the foregoing first pre-provisioned algorithm. Therefore, transmitter authentication information calculated with the first pre-provisioned algorithm in a certain QKD process is definite for the transmitter and the receiver, the transmitter encloses the information in quantum states, and the receiver may verify the identity of the transmitter with the information. Due to the uniqueness of the identification information and the dynamic variation of the value of n, the receiver can effectively defend against spoofing attacks, man-in-the-middle attacks or DDoS attacks.

Based on the first pre-provisioned algorithm provided above, this embodiment further provides an exemplary implementation in which the number of times the transmitter and the receiver perform the QKD process may be used as the value of the parameter n. For example, the transmitter and the receiver set the initial value of the parameter n to 0, the two parties set the respectively maintained value of n to 1 when the transmitter and the receiver initiate the QKD process for the first time, and set the value of n to 2 when they initiate the QKD process for the second time, and so on, so as to realize a synchronous variation of the value of n for both the transmitter and the receiver. In one or more implementations, when the value of n accumulates to a preset upper limit, the transmitter and the receiver can synchronously clear n to 0 and restart the accumulation.

In the foregoing implementation, identification information of different QKD requestors, i.e., transmitters in the present application, is definitely different for the same receiver, so transmitter authentication information provided by each requestor in the QKD process is different For the same QKD requestor, the value of n varies according to the number of times the QKD process is performed, so transmitter authentication information provided by the same requestor in different QKD processes is also different. In this case, the receiver can verify identity information of a requestor more securely and therefore can resist spoofing attacks, man-in-the-middle attacks or DDoS attacks more effectively.

In one or more implementations, in addition to the first pre-provisioned algorithm based on the identification information and the parameter n as provided in this embodiment, first pre-provisioned algorithms in other forms may also be used. For example, this technical solution of the present application may also be implemented by pre-provisioning the same random number between a transmitter and a receiver, pre-provisioning different random numbers for different transmitters and receivers, and using the random number to replace the identification information.

Step 101-2: Select a preparation basis of the transmitter authentication information according to a basis selection rule agreed upon with a receiver.

Because the transmitter and the receiver calculate transmitter authentication information with the same first pre-provisioned algorithm, the transmitter transmits the information in quantum states, and the receiver verifies the identity of the transmitter with the same information, the transmitter and the receiver can select a corresponding basis of preparation or measurement basis according to an agreed basis selection rule after the transmitter and the receiver obtain the transmitter authentication information by calculation.

The agreed basis selection rule may be preset by the transmitter and the receiver or negotiated and determined through a pre-determined channel before the QKD process is initiated. For example, the transmitter uses preparation bases of horizontal polarization and vertical polarization, and the receiver uses a linear polarization measurement basis for measurement; or, the transmitter uses preparation bases of left-hand polarization and right-hand polarization, and the receiver uses a circular polarization measurement basis for measurement. Specifically for instance, for a bit 0, the transmitter uses a basis of preparation of horizontal polarization, and the receiver uses a linear polarization measurement basis, and for a bit 1, the transmitter uses a basis of preparation of left-hand polarization, and the receiver uses a circular polarization measurement basis.

The transmitter selects, according to the agreed basis selection rule, a corresponding basis of preparation for a bit string corresponding to the transmitter authentication information generated in step 101-1.

Step 101-3: Transmit (in a preset manner) quantum states containing at least key information and the transmitter authentication information.

The preset manner may be pre-determined by the transmitter and the receiver, by which the transmitter transmits quantum states following the preset manner, and the receiver differentiates quantum states of various information following the same manner. For example, the transmitter may transmit quantum states of the transmitter authentication information and randomly generated key information with different wavelengths, and the receiver differentiates the quantum states with the different wavelengths accordingly.

Preferably, in order to provide further security assurance and prevent attackers from making targeted monitoring, the quantum states of the transmitter authentication information and the key information (which may be collectively called quantum states of data information) may be sent using the same wavelength, and control information may be introduced as prefixes of the transmitter authentication information and the key information to facilitate the differentiation of the quantum states by the receiver. Based on this consideration, in this embodiment, the transmitter transmits quantum states of the control information and the data information (including the key information and the transmitter authentication information) using different wavelengths in a preset information format, and the receiver differentiates the received quantum states of various information according to wavelength characteristics and the information format. The different wavelengths may be preset by the transmitter and the receiver or negotiated and determined through a pre-determined channel before the QKD process is initiated.

The information format may be defined in many manners as long as the receiver can correctly differentiate the quantum states. Several specific examples of which are given below.

Example 1

The transmitter authentication information and the key information have respective control information as prefixes (i.e., authentication control information and key control information in short, respectively), and wavelengths carrying quantum states of the two types of control information are different, referring to the schematic diagram of an information format shown in FIG. 3. A wavelength carrying the quantum states of the data information (including the transmitter authentication information and the key information) is $\lambda_1$, a wavelength carrying quantum states of the authentication control information is $\lambda_2$, a wavelength carrying quantum states of the key control information is $\lambda_3$, and $\lambda_1$, $\lambda_2$ and $\lambda_3$ are different from each other. $\lambda_2$ and $\lambda_3$ may be preset by the transmitter and the receiver or negotiated and determined before the quantum key negotiation process is initiated. In this manner, the transmitter can randomly select quantum states of the two types of control information, and the receiver can directly distinguish the authentication control information from the key control information according to the wavelengths.

Example 2

The transmitter authentication information and the key information have respective control information as prefixes, and the two types of control information have different codes, referring to the schematic diagram of an information format shown in FIG. 4. A wavelength carrying the quantum states of the data information (including the transmitter authentication information and the key information) is $\lambda_1$, a wavelength carrying quantum states of the authentication control information and a wavelength carrying quantum states of the key control information are both $\lambda_2$ (different from $\lambda_1$), but the two types of control information have different codes. For example, 00000 is the code of the authentication control information, and 11111 is the code of the key control information. The different codes are preset by the transmitter and the receiver or negotiated and determined through a pre-determined channel before the QKD process is initiated; and a basis for preparing or measuring quantum states of the two types of control information may also be preset by the transmitter and the receiver or negotiated and determined through the pre-determined channel before the QKD process is initiated.

Example 3

Figure 5:
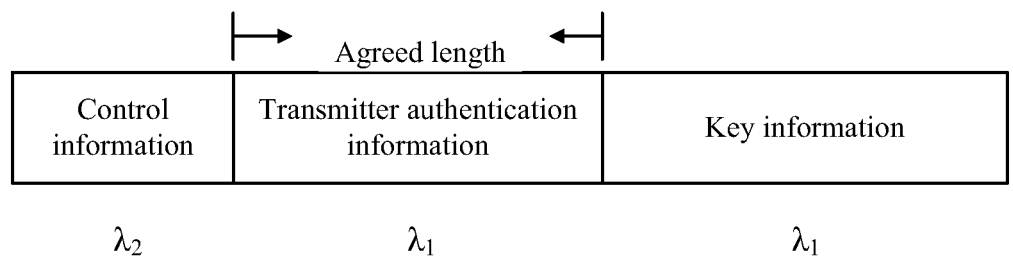
FIG. 5 is a schematic diagram of a third information format as provided in the embodiment of the present application.

The transmitter authentication information and the key information use common control information as a prefix, referring to the schematic diagram of an information format shown in FIG. 5. A wavelength carrying the quantum states of the data information (including the transmitter authentication information and the key information) is $\lambda_1$, the transmitter authentication information and the key information share the same control information prefix, a wavelength carrying quantum states of the control information is $\lambda_2$, which is different from $\lambda_1$. In this manner, because the receiver can distinguish the control information from the data information according to the wavelengths, the transmitter can randomly select the quantum states of the control information, but a length of the transmitter authentication information located between the control information and the key information should be agreed upon by the transmitter and the receiver so as to enable the receiver to correctly distinguish the transmitter authentication information from the key information in the data information. In one or more implementations, the length of the transmitter authentication information may be preset by the transmitter and the receiver or negotiated and determined through a pre-determined channel before the QKD process is initiated.

It should be noted that the examples given above and the corresponding diagrams provide just part of the information format, and in one or more implementations, each information format may be repeated many times and concatenated. For example, the information format provided in Example 3 may be extended as (for example, but not limited to): control information|transmitter authentication information|key information|control information|transmitter authentication information|key information.

In the foregoing implementation provided in this embodiment, the transmitter transmits quantum states of control information, transmitter authentication information and key information, according to wavelength characteristics and in an information format that are agreed upon with the receiver. For ease of understanding, description is made below using the information format in Example 3 as an example.

For example, the transmitter transmits quantum states of a binary bit string with a length of n at time points $t_1$, $t_2 \ldots t_n$, and the binary bit string is shown below:

$$x_1, x_2 \ldots x_i, x_{i+1} \ldots x_{i+m+1} \ldots x_n$$

The binary bit string comprises three parts: the first part is a control information bit string, the second part is an authentication information bit string, and the third part is a key information bit string. The control information bit string is a randomly selected binary bit string and has a length of i; the authentication information bit string is a transmitter authentication information bit string generated with the first pre-provisioned algorithm in step 101-1, and the length m thereof may be negotiated and determined by the transmitter and the receiver through a pre-determined channel; and the key information bit string is a randomly generated binary bit string and has a length of n-m-i.

The transmitter transmits a coded quantum states $(|\varphi_{j_1}^{x_1}, |\varphi_{j_2}^{x_2} \ldots |\varphi_{j_i}^{x_i}, |\varphi_{j_{i+1}}^{x_{i+1}} \ldots |\varphi_{j_{i+m}}^{x_{i+m}}|\varphi_{j_{i+m+1}}^{x_{i+m+1}} \ldots |\varphi_{j_n}^{x_n})$ of the binary bit string to the receiver at the time points $t_1$, $t_2, t_n$, where $j_1, j_2, j_i, j_{i+1} \ldots j_{i+m}, j_{i+m+1}, \ldots j_n$ is a basis of preparation sequence used by the transmitter, $j_1, j_2, j_i$ is a random quantum states basis of preparation corresponding to the control information bit string and has a wavelength of $\lambda_2$, $j_{i+1} \ldots j_{i+m}$ is a quantum states basis of preparation of the authentication information bit string that is selected according to the basis selection rule agreed upon by the transmitter and the receiver, $j_{i+m+1}, \ldots j_n$ is a random quantum states basis of preparation corresponding to the key information bit string, wavelengths of the preparation bases of the authentication information bit string and the key information bit string are both $\lambda_1$, which is different from $\lambda_2$.

Correspondingly, the receiver can distinguish the control information from the data information according to the wavelengths, distinguish the transmitter authentication information from the key information in the data information according to the length m, and use a measurement basis sequence $k_{i+1} \ldots k_{i+m}, k_{i+m+1} \ldots k_n$ to measure the received quantum states of the data information, where $k_{i+1} \ldots k_{i+m}$ is a measurement basis for the quantum states of the transmitter authentication information, the measurement basis is selected according to the basis selection rule agreed upon with the transmitter, and $k_{i+m+1} \ldots k_n$ is a random quantum states measurement basis corresponding to the quantum states of the key information.

At this point, the transmitter has completed the quantum states transmitting operation through steps 101-1 to 101-3. In this process, the transmitter generates transmitter authentication information with a first pre-provisioned algorithm, and the transmitter authentication information is not fixed but varies dynamically in different QKD processes initiated towards the receiver, so as to provide a guarantee for the receiver to defend against various possible spoofing attacks, man-in-the-middle attacks or DDoS attacks.

Step 102: The receiver uses a preset manner to differentiate the received quantum states of various information, and the receiver measures received quantum states of the transmitter authentication information according to the basis selection rule, and if a measurement result is consistent with transmitter authentication information calculated with the first pre-provisioned algorithm, transmits receiver authentication information generated with a second pre-provisioned algorithm; or determines that the transmitter is not authenticated and ends the QKD process otherwise.

In one or more implementations of this technical solution, the receiver verifies the identity of the transmitter by measuring the received quantum states of the transmitter authentication information, and if the transmitter is not authenticated, ends the QKD process; otherwise, the receiver may perform subsequent operations of measuring quantum states of the key information and the like.

Figure 6:
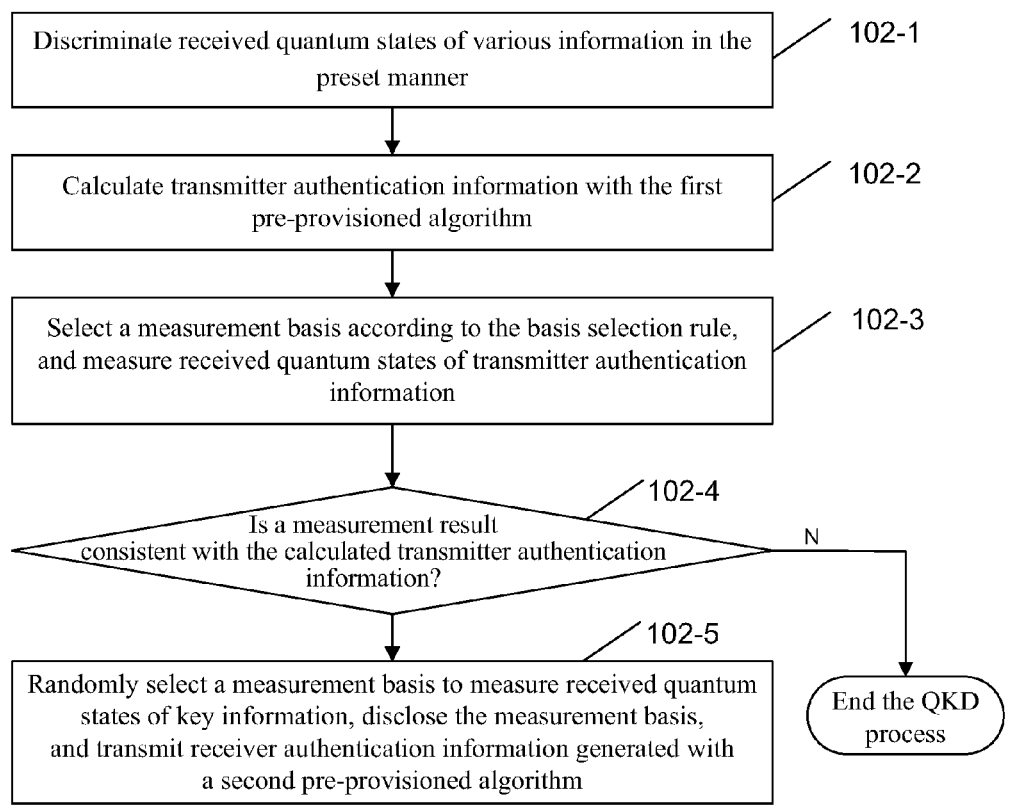
FIG. 6 is a process flow diagram depicting a receiver performing an authentication operation as provided in the embodiment of the present application.

Preferably, based on the above one-way authentication, the receiver may further provide its identity information to the transmitter for verification, and the transmitter can avoid "phishing attacks" and other possible attacks following this manner, so as to achieve a more secure two-way authentication. The specific process of the implementation comprises steps 102-1 to 102-5 and is further described below with reference to FIG. 6.

Step 102-1: Differentiate received quantum states of various information in the preset manner.

In this step, the receiver differentiates quantum states of information such as transmitter authentication information and key information in a preset manner agreed upon with the transmitter for quantum states of various information received from a quantum channel. In one or more implementations, different processing manners may be adopted according to different preset manners. Using the implementation provided in step 101-3 that the transmitter transmits quantum states of the control information and the data information with different wavelengths as an example, the quantum states of the control information and the data information may be differentiated first according to different wavelengths, and the quantum states of authentication information and key information may be differentiated further according to a preset information format.

For example, if the transmitter and the receiver agree upon the wavelength characteristics and the information format as demonstrated in Example 1 of step 101-3, in this step, if the receiver receives quantum states having a wavelength of $\lambda_2$, it can be known that the quantum states is the quantum states of the authentication control information, that subsequently received quantum states having a wavelength of $\lambda_1$ is the quantum states of the transmitter authentication information, and a measurement basis should be selected according to a basis selection rule agreed upon by the two parties for measurement. Instead, if quantum states having a wavelength of $\lambda_3$ are received, it can be known that a subsequently received quantum states having a wavelength of $\lambda_1$ is the quantum states of the key information, and a randomly selected measurement basis may be used for measurement.

For another example, if the transmitter and the receiver agree upon the wavelength characteristics and the information format as demonstrated in Example 2 of step 101-3 (e.g., if the receiver receives quantum states having a wavelength of $\lambda_2$), it can be known that the quantum states are the quantum states of the control information, and a measurement basis agreed upon (preset or negotiated and determined) with the transmitter is used for measurement. A measurement result is compared with an agreed-upon coded value to acquire the type of the received control information: authentication control information or key control information, and if quantum states having a wavelength of $\lambda_1$ is received subsequently, a measurement basis corresponding to the type may be used for measurement.

For the wavelength characteristics and the information format as demonstrated in Example 3 of step 101 and other wavelength characteristics and information formats that may be used by the transmitter, the receiver may also differentiate or filter the quantum states of various information in a similar manner, which will not be described herein again.

Step 102-2: Calculate transmitter authentication information with the first pre-provisioned algorithm.

According to this embodiment, the transmitter and the receiver are preset with the same algorithm for calculating transmitter authentication information, i.e., the first pre-provisioned algorithm in the present application. Reference can be made to the description of step 101-1 for details of the algorithm, which will not be described herein again.

Because the receiver is pre-provisioned with the same algorithm, authentication information that should be provided by the transmitter can be expected, and in this step, the receiver calculates transmitter authentication information with the first pre-provisioned algorithm to serve as an expected value of authentication information provided by the transmitter.

Step 102-3: Select a measurement basis according to the basis selection rule, and measure received quantum states of transmitter authentication information.

According to this embodiment, the transmitter and the receiver agree upon a basis selection rule. Reference can be made to the description of step 101-2 for description of the basis selection rule, which will not be described herein again.

If a fixed measurement basis (e.g., a linear polarization measurement basis) is set for the receiver in the basis selection rule, the received quantum states of the transmitter authentication information is measured by using the fixed measurement basis. If different measurement bases are set for different bit values in the basis selection rule, in this step, a corresponding measurement basis is selected according to the value of each bit of the transmitter authentication information calculated in step 102-2, and a corresponding bit in the received quantum states of the transmitter authentication information is measured.

Step 102-4: Determine whether a measurement result is consistent with the calculated transmitter authentication information, and if so, perform step 102-5; and end the QKD process otherwise.

A corresponding measurement result, namely, the transmitter authentication information carried in the quantum states, is obtained through the measurement in step 102-3. In this step, the measured transmitter authentication information is compared with the transmitter authentication information calculated in step 102-2, so as to complete authentication on the transmitter.

In this embodiment, the transmitter generates transmitter authentication information with a first pre-provisioned algorithm Y=f(userid_A, n). The receiver also uses the same algorithm to calculate an expected value of the information, and compares measured transmitter authentication information with the expected value. If the measured transmitter authentication information is consistent with the expected value, it indicates that the transmitter uses the correct identification information userid_A, variable n, and function ƒ when generating its authentication information, and only a quantum communication device having legal identity can acquire the foregoing information. Thus, it can be determined that the transmitter is authenticated, and therefore a subsequent step 102-5 can be performed accordingly. If, on the contrary, it can be determined that the transmitter is not authenticated, the QKD process is ended.

In a quantum channel transmission process, a few photons may fail to be detected or the measurement result may not be completely consistent with the expectation due to factors such as attenuation and noise interference. In this case, it may lead to a meaningless reduction in the distribution amount of quantum keys if the transmitter is considered to fail the authentication and the QKD process is ended. Based on this consideration as well as the requirement for defense against spoofing attacks, man-in-the-middle attacks or DDoS attacks, a manner of setting a threshold may be adopted. That is, if the difference between transmitter authentication information measured by the receiver and an expected value is less than a preset threshold, for example, the number of bits of the measured transmitter authentication information inconsistent with the expected value is less than a preset upper limit value, the receiver may consider that the transmitter is authenticated.

Step 102-5: Randomly select a measurement basis to measure received quantum states of key information, disclose the measurement basis, and transmit receiver authentication information generated with a second pre-provisioned algorithm.

Upon reaching this step, the transmitter has been authenticated by the receiver, and therefore, the QKD process can be continued, and the receiver may randomly select a measurement basis to measure received quantum states of key information, and to disclose the measurement basis through a pre-determined channel according to a QKD protocol. In this embodiment, the disclosed measurement basis may be encrypted with a variable n maintained by the receiver and then transmitted, and the transmitter also uses a variable n maintained by the transmitter to decrypt the measurement basis after receiving it.

In order to provide further security assurance and to achieve two-way authentication, the transmitter and the receiver may be pre-provisioned with the same algorithm for calculating receiver authentication information, i.e., the second pre-provisioned algorithm in the present application. According to these embodiments, the receiver generates its authentication information with the algorithm and provides it to the transmitter, and the transmitter verifies the identity of the receiver with the same algorithm.

In one or more implementations, the required second pre-provisioned algorithm may be designed to meet requirements. In this embodiment, in order to generate dynamic receiver authentication information, the following second pre-provisioned algorithm is applied based on the first pre-provisioned algorithm: receiver authentication information is calculated according to receiver identification information userid_B and a variant of a synchronously changing parameter n according to a preset policy by the transmitter and the receiver. Reference can be made to the relevant text in step 101-1 for description of the parameter n. The variant of the synchronously changing parameter n according to the preset policy may include: the parameter n itself; or a result obtained by processing the parameter using a preset mathematical transformation method, for example, n+1. A rule for generating the variant of the parameter n may be agreed upon by the transmitter and the receiver.

A specific example of the second pre-provisioned algorithm is given below: receiver authentication information Y=hash(userid_B, n+1), that is, a hash value of a character string formed by joining receiver identification information and information of the variant of the parameter n is calculated, and the hash value is used as the receiver authentication information.

It can be seen from the above description that the receiver authentication information calculated with the second pre-provisioned algorithm also varies dynamically. For the transmitter in this embodiment, different receivers have different identification information, so they provide different receiver authentication information. For the same receiver, because the value of n varies dynamically, the receiver authentication information provided by the receiver also varies dynamically. Furthermore, if the number of times the transmitter and the receiver perform the QKD process is used as the parameter n, receiver authentication information provided by the same receiver in different QKD processes is also different. It is difficult for attackers to mimic the dynamic characteristic, thereby providing a strong guarantee for the transmitter to avoid attacks such as phishing by verifying the identity of the receiver.

Step 103: The transmitter calculates receiver authentication information with the second pre-provisioned algorithm, and when the received receiver authentication information is consistent with the calculation result, determines that the receiver is authenticated. If the received receiver authentication information is not consistent, then the receiver is determined not to be authenticated and the QKD process is ended.

After receiving the receiver authentication information, the transmitter calculates receiver authentication information with the second pre-provisioned algorithm, and compares the received receiver authentication information with the calculated one, so as to complete the authentication on the receiver.

Using the specific example given in step 102-5, the transmitter calculates receiver authentication information with the second pre-provisioned algorithm, that is, Y=hash(userid_B, n+1), where userid_B may be pre-provisioned or sent in advance by the receiver to the transmitter through a pre-determined channel. If the received receiver authentication information is consistent with the calculation result, it indicates that the receiver uses the correct identification information userid_B, variable n, and hash function when generating its authentication information. If the transmitter also knows the variant generation rule agreed upon by the two parties, and only a quantum communication device having legal identity can acquire the foregoing information, it can then determine that the receiver is authenticated; otherwise, it determines that the receiver is not authenticated and the QKD process is ended.

If the transmitter determines that the receiver is authenticated, the transmitter may, according to the QKD protocol, compare a measurement basis disclosed by the receiver with a basis of preparation used by the transmitter to select a correct measurement basis, screen out an original key according to the correct measurement basis, and disclose the correct measurement basis to the receiver through the pre-determined channel.

Subsequently, the receiver screens an original key according to the correct measurement basis disclosed by the transmitter, the transmitter and the receiver further acquire a final shared quantum key through bit error rate estimation, error correction and privacy amplification processes, and the QKD process is ended. In this embodiment, at the bit error rate estimation, error correction and privacy amplification stages, information negotiated by the transmitter and the receiver through the pre-determined channel may be a variant of the parameter n (for example, n+1), for performing the corresponding encryption or decryption operation.

At this point, it can be seen from the foregoing step 101 to step 103 that this technical solution described in this embodiment improves the existing QKD protocol and provides a new idea for performing dynamic authentication in a QKD process. Because the transmitter transmits, through the quantum channel, authentication information that is generated with the first pre-provisioned algorithm and varies dynamically in different QKD processes initiated towards the receiver, and the receiver also uses the same pre-provisioned algorithm to verify the received authentication information, dynamic authentication is realized on a QKD requestor in a QKD process, and an effective defense can be provided against spoofing attacks, man-in-the-middle attacks and DDoS attacks on the receiver. Furthermore, on the basis of the one-way authentication, the transmitter and the receiver use the second pre-provisioned algorithm to realize dynamic authentication on the receiver by the transmitter, thereby effectively resisting potential risks of phishing attacks on the transmitter.

In addition, in this solution, the transmitter authentication information is sent in the form of quantum states, so that security can be further improved, and a waste of quantum key resources can be avoided, as authentication information is dynamically generated with an algorithm.

Figure 7:
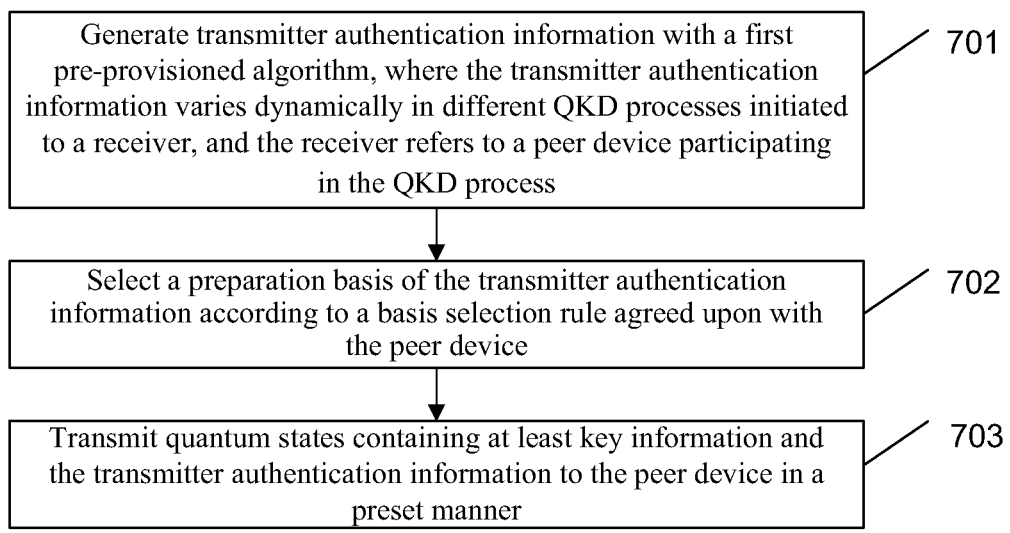
FIG. 7 is a flow diagram of an embodiment of another authentication method used in a QKD process as provided in the present application.

In addition, the present application further provides another authentication method used in a QKD process. The method is implemented on a quantum communication transmitter device participating in a QKD process. FIG. 7 illustrates a flow diagram of an embodiment of another authentication method used in a QKD process in the present application. The same steps in this embodiment as the foregoing embodiment are not described again, and the following description focuses on the differences. The method comprises the following steps:

Step 701: Generate transmitter authentication information with a first pre-provisioned algorithm, where the transmitter authentication information generated with the first pre-provisioned algorithm varies dynamically in different QKD processes initiated to a receiver, and the receiver device refers to a peer device participating in the QKD process.

The first pre-provisioned algorithm comprises: calculating the transmitter authentication information according to identification information of a host device and a synchronously changing parameter with the peer device according to a preset policy. The calculation of the transmitter authentication information may employ a hash function.

Step 702: A preparation basis of the transmitter authentication information is selected according to a basis selection rule agreed upon with the peer device.

Step 703: Quantum states containing at least key information and the transmitter authentication information are transmitted to the peer device in a preset manner.

For example, quantum states of control information and data information may be sent with different wavelengths in a preset information format, where the data information comprises the key information and the transmitter authentication information.

The preset information is formatted so that the authentication information and the key information have respective control information as prefixes; or the authentication information and the key information use common control information as a prefix, and a length of the authentication information between the control information and the key information is preset or negotiated and determined with the peer device through a pre-determined channel.

After the quantum states transmission operation in this step is completed, information returned by the peer device may be received, where the information comprises at least receiver authentication information. Additionally, receiver authentication information may be calculated with a second pre-provisioned algorithm; whether the received receiver authentication information is consistent with the calculation result is determined. If the received receiver authentication information is consistent with the calculation result, the receiver is determined to be authenticated; otherwise, that the receiver is determined not to be authenticated and the QKD process is ended.

The second pre-provisioned algorithm comprises calculating the receiver authentication information according to identification information of the peer device and a variant of a synchronously changing parameter with the peer device according to a preset policy. The synchronously changing parameter with the peer device according to the preset policy consists of the number of times the QKD process is performed with the peer device. The calculation of the receiver authentication information may employ a hash function.

The information returned by the peer device may include not only the receiver authentication information, but also a measurement basis for measuring quantum states of the key information. After the determining that the receiver is authenticated, the following operations may be performed: determining a correct measurement basis of the quantum states of the key information, screening an original key, disclosing the correct measurement basis of the quantum states of the key information through a pre-determined channel, and acquiring a final shared quantum key through bit error rate estimation, error correction and privacy amplification processes, so as to complete the QKD process.

Figure 8:
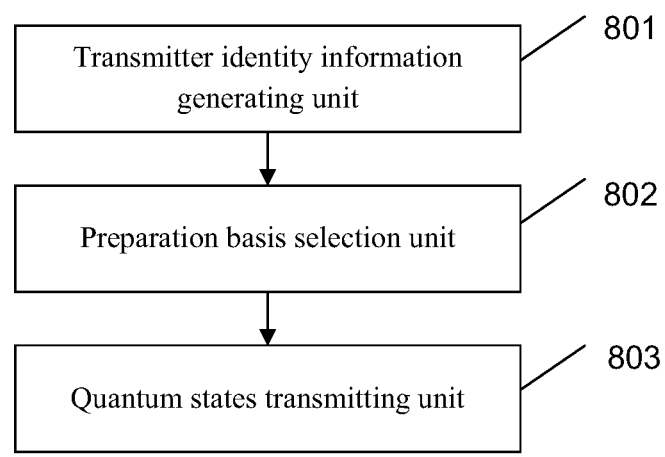
FIG. 8 is a schematic diagram of an embodiment of an authentication apparatus used in a QKD process as provided in the present application.

Another authentication method used in a QKD process is provided in the foregoing embodiment. Correspondingly, the present application further provides an authentication apparatus used in a QKD process. The apparatus is deployed on a quantum communication transmitter device participating in a QKD process. FIG. 8 illustrates a schematic diagram of an embodiment of an authentication apparatus used in a QKD process in the present application. The apparatus embodiment is basically similar to the method embodiment and therefore is described briefly. Reference can be made to the description of the method embodiment for relevant parts. The apparatus embodiment described below is merely exemplary.

An authentication apparatus used in a QKD process in this embodiment comprises: an transmitter identity information generating unit 801, configured to generate transmitter authentication information with a first pre-provisioned algorithm, where the transmitter authentication information varies dynamically in different QKD processes initiated to a receiver; a basis of preparation selection unit 802, configured to select a basis of preparation of the transmitter authentication information according to a basis selection rule agreed upon with a peer device participating in the QKD process; and quantum states transmitting unit 803, configured to transmit quantum states containing at least key information and the transmitter authentication information to the peer device in a preset manner.

In an embodiment, the apparatus further comprises:

a receiver identity information receiving unit, configured to, after the quantum states transmitting unit completes the quantum states transmitting operation, receive information returned by the peer device, where the information comprises at least receiver authentication information;

a receiver identity information calculation unit, configured to calculate receiver authentication information with a second pre-provisioned algorithm; and a receiver authentication unit, configured to determine whether the received receiver authentication information is consistent with the calculation result, and if so, determine that a receiver is authenticated;

and to determine that the receiver is not authenticated and end the QKD process otherwise.

In an embodiment, the information received by the receiver identity information receiving unit not only comprises the receiver authentication information but also comprises a measurement basis used by the peer device for measuring quantum states of the key information. In these embodiments, the apparatus may comprise:

an original key screening unit, configured to determine a correct measurement basis of the quantum states of the key information, and screen an original key after the receiver authentication unit determines that the receiver is authenticated;

a correct measurement basis disclosing unit, configured to disclose the correct measurement basis of the quantum states of the key information through a pre-determined channel; and a shared quantum key generating unit, configured to acquire a final shared quantum key through bit error rate estimation, error correction and privacy amplification processes.

In an embodiment, the first pre-provisioned algorithm used by the transmitter identity information generating unit comprises calculating the transmitter authentication information according to identification information of a host device and a synchronously changing parameter with the peer device according to a preset policy.

In an embodiment, the second pre-provisioned algorithm used by the receiver identity information calculation unit comprises calculating the receiver authentication information according to identification information of the peer device and a variant of a synchronously changing parameter with the peer device according to a preset policy.

In an embodiment, the synchronously changing parameter used for calculation within the transmitter identity information generating unit and the receiver identity information calculation unit according to the preset policy comprises the number of times the QKD process is performed with the peer device.

In an embodiment, the transmitter identity information generating unit or the receiver identity information calculation unit is specifically configured to calculate the corresponding authentication information with a hash function.

In an embodiment, the quantum states transmitting unit is specifically configured to transmit quantum states of control information and data information by respectively using different wavelengths in a preset information format, and the data information comprises the key information and the transmitter authentication information.

In an embodiment, the preset information format used by the quantum states transmitting unit includes the authentication information and the key information using respective control information as prefixes.

In an embodiment, the preset information format used by the quantum states transmitting unit includes the authentication information and the key information using common control information as a prefix, and a length of the authentication information between the control information and the key information is preset or negotiated and determined with the peer device through a pre-determined channel.

Figure 9:
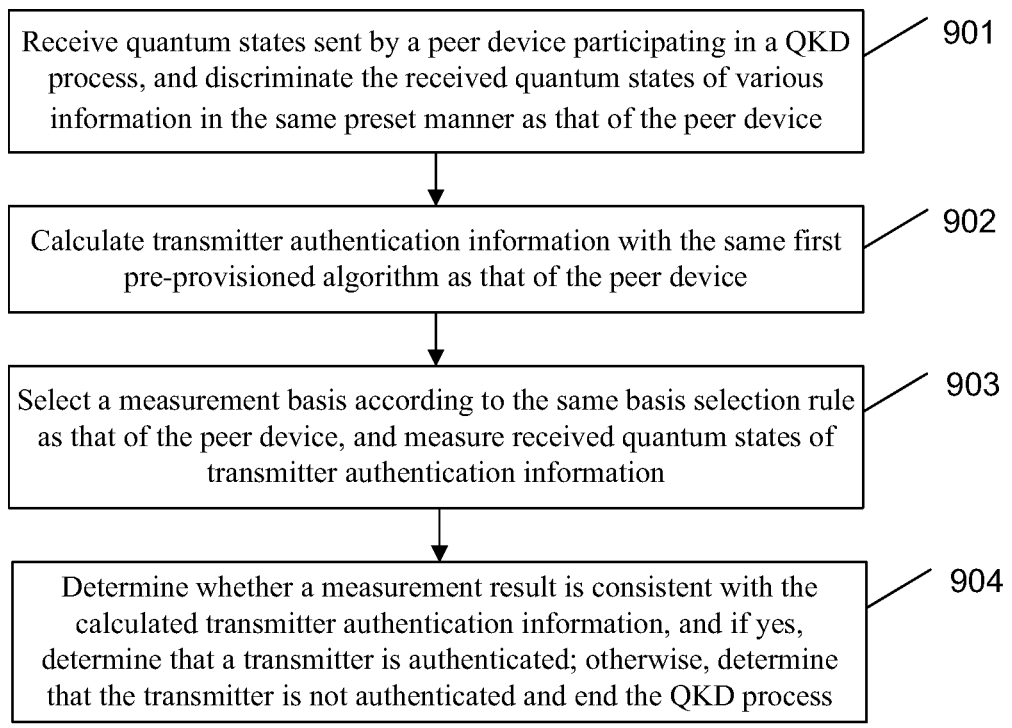
FIG. 9 is a flow diagram of an embodiment of a third authentication method used in a QKD process as provided in the present application.

In addition, the present application further provides a third authentication method used in a QKD process. The method is implemented on a quantum communication receiver device participating in a QKD process. FIG. 9 illustrates a flow diagram of an embodiment of a third authentication method used in a QKD process in the present application. The same steps in this embodiment as the foregoing embodiment are not described again, and the following focuses on differences. The method comprises the following steps:

Step 901: Receive quantum states sent by a peer device participating in a QKD process, and differentiate the received quantum states of various information in the same preset manner as that of the peer device.

Step 902: Calculate transmitter authentication information with the same first pre-provisioned algorithm as that of the peer device.

Step 903: Select a measurement basis according to the same basis selection rule as that of the peer device, and measure received quantum states of transmitter authentication information.

Step 904: Determine whether a measurement result is consistent with the calculated transmitter authentication information, and if so, determine that a transmitter is authenticated; otherwise, determine that the transmitter is not authenticated and end the QKD process.

In one or more embodiments, the following operations may be performed after determining that the transmitter is authenticated: generating receiver authentication information with the same second pre-provisioned algorithm as that of the peer device, and transmitting the receiver authentication information to the peer device.

In one or more other embodiments, the following operations may be performed after determining that the transmitter is authenticated: randomly selecting a measurement basis to measure received quantum states of the key information, and disclosing the measurement basis through a pre-determined channel; receiving a correct measurement basis of the quantum states of the key information sent by the peer device through the pre-determined channel; and screening an original key, and acquiring a final shared quantum key through bit error rate estimation, error correction and privacy amplification processes.

Figure 10:
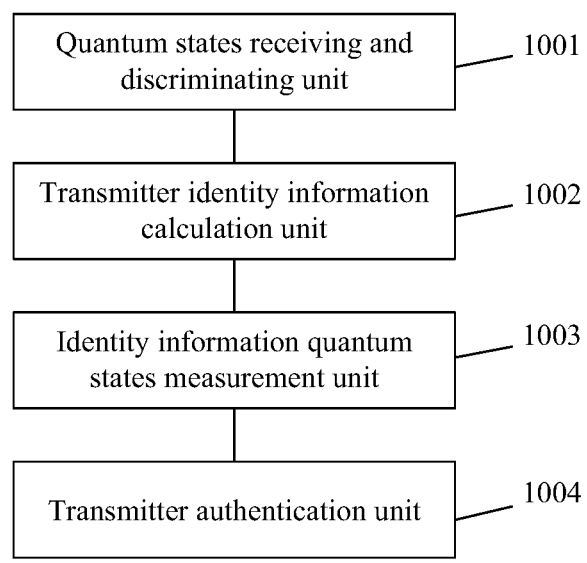
FIG. 10 is a schematic diagram of an embodiment of an authentication apparatus used in a QKD process as provided in the present application.

The third authentication method used in a QKD process is provided in the foregoing embodiment. Correspondingly, the present application further provides an authentication apparatus used in a QKD process. The apparatus is deployed on a quantum communication receiver device participating in a QKD process. Referring to FIG. 10, FIG. 10 is a schematic diagram of an embodiment of an authentication apparatus used in a QKD process in the present application. The apparatus embodiment is basically similar to the method embodiment and therefore is described briefly. Reference can be made to the description of the method embodiment for relevant parts. The apparatus embodiment described below is merely exemplary.

An authentication apparatus used in a QKD process in this embodiment comprises: a quantum states receiving and differentiating unit 1001, configured to receive quantum states sent by a peer device participating in the QKD process, and to differentiate the received quantum states of various information in the same preset manner as that of the peer device; a transmitter identity information calculation unit 1002, configured to calculate transmitter authentication information with the same first pre-provisioned algorithm as that of the peer device; an identity information quantum states measurement unit 1003, configured to select a measurement basis according to the same basis selection rule as that of the peer device, and to measure received quantum states of transmitter authentication information; and a transmitter authentication unit 1004, configured to determine whether a measurement result is consistent with the calculated transmitter authentication information, and if so, to determine that a transmitter is authenticated; and to determine that the transmitter is not authenticated and end the QKD process otherwise.

In an embodiment, the apparatus further comprises:

a receiver identity information generating unit, configured to generate receiver authentication information with the same second pre-provisioned algorithm as that of the peer device after the transmitter authentication unit determines that the transmitter is authenticated; and a receiver identity information transmitting unit, configured to transmit the receiver authentication information to the peer device.

In an embodiment, the apparatus further comprises:

a key information quantum states measurement basis disclosing unit, configured to randomly select a measurement basis to measure received quantum states of key information after the transmitter authentication unit determines that the transmitter is authenticated, and disclose the measurement basis through a pre-determined channel;

a correct measurement basis receiving unit, configured to receive a correct measurement basis of the quantum states of the key information sent by the peer device through the pre-determined channel; and a screening and shared quantum key generating unit, configured to screen an original key, and acquire a final shared quantum key through bit error rate estimation, error correction and privacy amplification processes.

Figure 11:
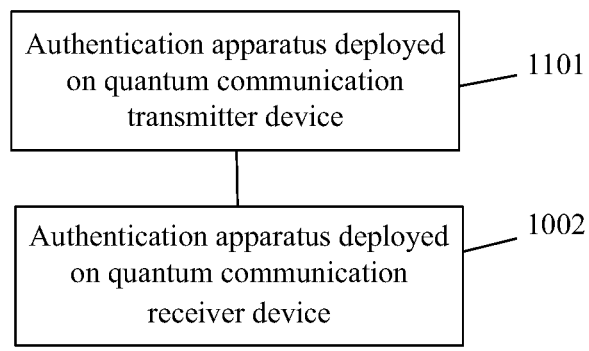
FIG. 11 is a schematic diagram of an embodiment of an authentication system used in a QKD process as provided in the present application.

In addition, an embodiment of the present application further provides an authentication system used in a QKD process. As shown in FIG. 11, the system comprises an authentication apparatus 1101 deployed on a quantum communication transmitter device and an authentication apparatus 1102 deployed on a quantum communication receiver device.

Figure 12:
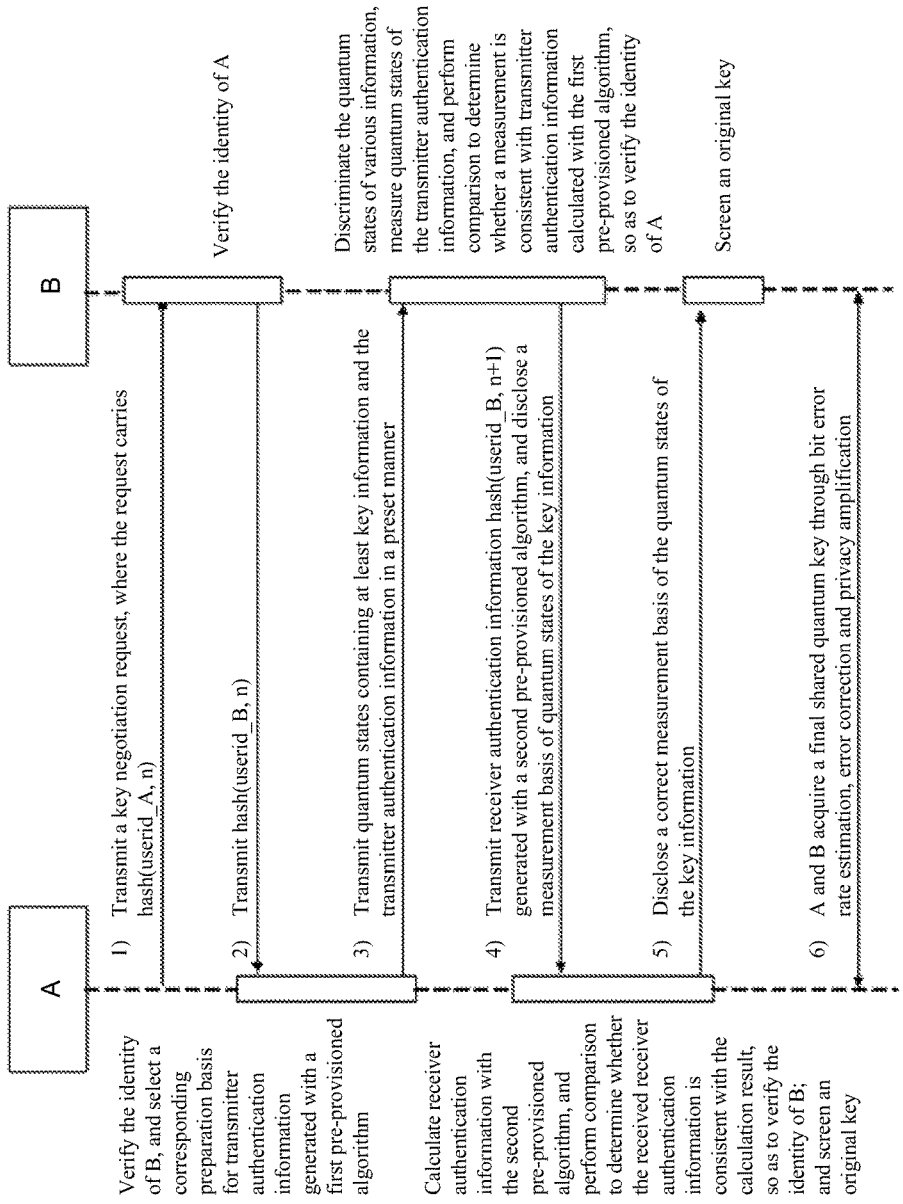
FIG. 12 is a schematic diagram illustrating an interactive processing flow of the authentication system as provided in the embodiment of the present application.

The authentication apparatuses respectively deployed on the quantum communication transmitter device and the quantum communication receiver device use an authentication method provided in the present application to realize dynamic authentication on a peer device in a QKD process. An interactive processing flow of the authentication system used in a QKD process is described briefly below with reference to FIG. 12. The authentication apparatus deployed on the quantum communication transmitter device is called A for short, the authentication apparatus deployed on the quantum communication receiver device is called B for short, the transmitter and the receiver are both preset with identification information userid_A and userid_B as well as a first pre-provisioned algorithm and a second pre-provisioned algorithm, and the transmitter and the receiver respectively maintain a synchronously changing parameter n according to a preset policy.

1) A transmits a key negotiation request to B, where the request carries hash(userid_A, n).

2) B verifies the validity of the identity of A and transmits hash(userid_B, n) to A.

3) A verifies the validity of the identity of B; and selects, according to a basis selection rule agreed upon with B, a corresponding basis of preparation for transmitter authentication information generated with a first pre-provisioned algorithm f(userid_A, n), and transmits quantum states containing at least key information and the transmitter authentication information in a preset manner.

4) B differentiates the received quantum states of various information in the preset manner, and measures received quantum states of the transmitter authentication information according to the basis selection rule. In addition, if a measurement result is consistent with transmitter authentication information calculated with the first pre-provisioned algorithm f(userid_A, n), B also transmits receiver authentication information hash(userid_B, n+1) generated with a second pre-provisioned algorithm, randomly selects a measurement basis to measure received quantum states of the key information, and then discloses the measurement basis. Otherwise, the transmitter is not authenticated and the QKD process is ended.

5) A calculates receiver authentication information with the second pre-provisioned algorithm, and when the received receiver authentication information is consistent with the calculation result, screens an original key, and discloses a correct measurement basis of the quantum states of the key information through a pre-determined channel; otherwise, determines that the receiver is not authenticated and ends the QKD process.

6) B screens an original key; and A and B acquire a final shared quantum key through bit error rate estimation, error correction and privacy amplification processes.

It should be noted that a possible interaction process of the system is shown above, and different ways of interaction may be adopted in other implementations. Relevant description is made in the method embodiments provided above and will not be repeated herein.

The present application has been disclosed above according to one or more embodiments, but is not intended to be limited thereto. Possible variations and modifications can be made by those skilled in the art without deviating from the spirit and scope of the present application. Therefore, the scope of the present application shall be defined by the claims of the present application.

In a typical configuration, a computing device includes one or more processors (CPUs), input-output interfaces, network interfaces and memories.

A memory may include a volatile memory in a computer-readable medium, a random access memory (RAM) and/or a non-volatile memory, such as a read-only memory (ROM) or a flash RAM. A memory is an example of a computer-readable medium.

A computer-readable medium includes a non-volatile medium, a volatile medium, a mobile medium or an immobile medium, which may implement information storage by means of any method or technology. Information may be a computer-readable instruction, a data structure, a module of a program, or other data. Examples of computer storage media include, but are not limited to a phase change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc-read only memory (CD-ROM), a digital versatile disc (DVD) or other optical memories, a cartridge magnetic tape, a magnetic tape or magnetic disk memory or other magnetic storage devices or any other non-transmission media, which may be configured to store information that can be accessed by a computing device. As defined herein, computer-readable media do not include transitory media, for example, modulated data signals and carriers.

Those skilled in the art should understand that an embodiment of the present application may be provided as a method, a system or a computer program product. Therefore, the present application may be in the form of a full hardware embodiment, a full software embodiment, or an embodiment combining software and hardware. Furthermore, the present application may be in the form of computer program products implemented on one or more computer storage media (including, but not limited to a magnetic disk memory, a CD-ROM, an optical memory or the like), which include a computer program code.

The invention claimed is:

1. A method for distributing quantum keys, the method comprising:

generating, with a transmitter, a transmitter authentication bit string and a key bit string, wherein the transmitter authentication bit string is non-random and the key bit string is random, and the transmitter authentication bit string includes control bits and authentication bits, and the key bit string includes control bits and key bits, wherein the control bits and the authentication bits of the transmitter authentication bit string are transmitted on different wavelengths, and the control bits and the key bits of the key bit string are transmitted on different wavelengths;

sequentially transmitting, with the transmitter, the transmitter authentication bit string and the key bit string as quantum states, the transmitter authentication bit string being transmitted as quantum states using a predetermined basis;

receiving, with a receiver, the quantum states;

measuring, with the receiver, the quantum states of the transmitter authentication bit string using the predetermined basis to generate a receiver-measured transmitter authentication bit string;

generating, with the receiver, a receiver-determined transmitter authentication bit string; and when the receiver-measured transmitter authentication bit substantially matches the receiver-determined transmitter authentication bit string, measuring the quantum states of the key bit string using a random basis to generate a receiver-measured key bit string.

2. The method of claim 1, further comprising:

generating, with the receiver, a receiver authentication bit-string;

transmitting, with the receiver, the receiver authentication bit string and an identification of the random basis;

receiving, with the transmitter, the receiver authentication bit string as a transmitter-receiver authentication bit string, and the identification of the random basis as transmitter-received random basis;

generating with the transmitter, a transmitter-determined receiver authentication bit string;

when the transmitter-received receiver authentication bit string matches the transmitter-determined receiver authentication bit string, determining a correct measurement basis based on the transmitter-received random basis; and extracting, with the transmitter, a secret key from the bit string using the correct measurement basis.

3. The method of claim 2, further comprising:

transmitting, with the transmitter, the correct measurement basis;

receiving, with the receiver, the correct measurement basis as a received corrected basis; and extracting the secret key from the receiver-measured key bit string using the received corrected basis.

4. The method of claim 1, wherein generating the transmitter authentication bit string includes:

determining, with the transmitter, a transmitter identification;

determining, with the transmitter, a synchronously changing parameter according to a preset policy by both the transmitter and the receiver and inputting the transmitter identification and the synchronously changing parameter into a first pre-provisioned algorithm to generate the transmitter authentication bit string.

5. The method of claim 4, wherein the synchronously changing parameter according to the preset policy includes a number of times the transmitter and the receiver perform a quantum key distribution ("QKD") processes.

6. The method of claim 4, wherein generating the receiver-determined transmitter authentication bit string includes:

determining, with the receiver, the transmitter identification;

determining, with the receiver, the synchronously changing parameter according to the preset policy; and inputting the transmitter identification and the synchronously changing parameter into the first pre-provisioned algorithm to generate the receiver-determined transmitter authentication bit string.

7. The method of claim 6 wherein generating the receiver authentication bit string includes:

determining, with the receiver, a receiver identification;

determining, with the receiver, a variant of the synchronously changing parameter according to the preset policy; and inputting the receiver identification and the variant of the synchronously changing parameter into a second pre-provisioned algorithm to generate the receiver authentication bit string.

8. The method of claim 7, wherein generating the transmitter-determined receiver authentication bit string includes:

determining, with the transmitter, the receiver identification;

determining, with the transmitter, the variant of the synchronously changing parameter according to the preset policy; and inputting the receiver identification and the variant of the synchronously changing parameter into the second pre-provisioned algorithm to generate the receiver authentication bit string.

9. The method of claim 7, wherein the first and second pre-provisioned algorithms include a hash function.

10. The method of claim 1, wherein the transmitter authentication bit string having an agreed length.

11. An apparatus for distributing quantum keys, the apparatus comprising:

a memory;

a processor coupled to the memory, the processor to:

generate a transmitter authentication bit string and a key bit string, wherein the transmitter authentication bit string is non-random and the key bit string is random, and the transmitter authentication bit string includes control bits and authentication bits, and the key bit string includes control bits and key bits, wherein the control bits and the authentication bits of the transmitter authentication bit string are transmitted on different wavelengths, and the control bits and the key bits of the key bit string are transmitted on different wavelengths;

sequentially transmit the transmitter authentication bit string the key bit string as quantum states, the transmitter authentication bit string being transmitted as quantum states using a predetermined basis;

receive a receiver authentication bit string as a transmitter-received receiver authentication bit string, and an identification of a random basis as a transmitter-received random basis;

generate a transmitter-determined receiver authentication bit string;

when the transmitter-received receiver authentication bit string matches the transmitter-determined receiver authentication bit string, determine a correct measurement basis based on the transmitter-received random basis; and extract a secret key from the key bit string using the correct measurement basis.

12. The apparatus of claim 11 wherein to generate the transmitter authentication bit string, the processor to further:

determine a transmitter identification;

determine a synchronously changing parameter according to a preset policy; and input the transmitter identification and the synchronously changing parameter into a first pre-provisioned algorithm to generate the transmitter authentication bit string.

13. The apparatus of claim 12, wherein to generate the transmitter-determined receiver authentication bit string, the processor to further:
   determine a receiver identification;
   determine a variant of the synchronously changing parameter according to the preset policy; and
   input the receiver identification and the variant of the synchronously changing parameter into a second pre-provisioned algorithm to generate the transmitter-determined receiver authentication bit string.

14. An apparatus for distributing quantum keys, the apparatus comprising:
   a memory;
   a processor coupled to the memory, the processor to:
   receive a plurality of quantum states, the plurality of quantum states representing a transmitter authentication bit string and a key bit string, wherein the transmitter authentication bit string is non-random and the key bit string is random, and the transmitter authentication bit string includes control bits and authentication bits, and the key bit string includes control bits and key bits, wherein the control bits and the authentication bits of the transmitter authentication bit string are transmitted on different wavelengths, and the control bits and the key bits of the key bit string are transmitted on different wavelengths;
   measure the quantum states of the transmitter authentication bit string using a predetermined basis to generate a receiver-measured transmitter authentication bit string;
   generate a receiver-determined transmitter authentication bit string; and
   when the receiver-measured transmitter authentication bit string substantially matches the receiver-determined transmitter authentication bit string, measure the quantum states of the key bit string using a random basis.

15. The apparatus of claim 14, wherein to generate a receiver-determined transmitter authentication bit string, the processor to further:
   determine a transmitter identification;
   determine a synchronously changing parameter according to a preset policy; and
   input the transmitter identification and the synchronously changing parameter into a pre-provisioned algorithm to generate the receiver-determined transmitter authentication bit string.

16. The apparatus of claim 15, wherein the processor to further:
   generate a receiver authentication bit string; and
   transmit the receiver authentication bit string and an identification of the random basis.

* * * * *